United States Patent [19]

Nakayama et al.

[11] Patent Number: 5,339,918
[45] Date of Patent: Aug. 23, 1994

[54] DRIVE SYSTEM FOR AUTOMOBILE

[75] Inventors: Hiroshi Nakayama; Tomokazu Takeda; Toshiyuki Yomoto; Mitsuo Kitada; Shoji Ohta; Masatoshi Chosa, all of Saitama, Japan

[73] Assignee: Honda Giken Kogyo Kabushiki Kaisha, Tokyo, Japan

[21] Appl. No.: 986,887

[22] Filed: Dec. 3, 1992

Related U.S. Application Data

[60] Continuation of Ser. No. 720,906, Jun. 25, 1991, abandoned, which is a division of Ser. No. 282,476, Dec. 9, 1988, Pat. No. 5,046,578.

[30] Foreign Application Priority Data

| Dec. 11, 1987 | [JP] | Japan | 62-313827 |
| Dec. 11, 1987 | [JP] | Japan | 62-313828 |
| Dec. 11, 1987 | [JP] | Japan | 62-313829 |
| Dec. 11, 1987 | [JP] | Japan | 62-313830 |
| Apr. 18, 1988 | [JP] | Japan | 63-95283 |

[51] Int. Cl.$^5$ ............................... B60K 5/02
[52] U.S. Cl. ................... 180/292; 180/291; 475/200
[58] Field of Search .......... 180/291, 312, 297; 123/195 AC, 198 E; 475/198, 200

[56] References Cited

U.S. PATENT DOCUMENTS

| 3,494,225 | 2/1970 | Binder et al. | 475/198 |
| 4,417,642 | 11/1983 | Suzuki et al. | 180/297 |

FOREIGN PATENT DOCUMENTS

| 183051 | 6/1986 | European Pat. Off. |
| 2139340 | 2/1973 | Fed. Rep. of Germany. |
| 2001593 | 2/1979 | United Kingdom. |

Primary Examiner—Eric Culbreth
Attorney, Agent, or Firm—Lyon & Lyon

[57] ABSTRACT

An engine is disposed in a front portion of an automobile and has a crankshaft extending in a longitudinal direction of the automobile. A transmission is coupled to a rear end of the engine and a final speed reduction gear unit is disposed laterally of the engine and separate from the transmission. The output shaft of the transmission and the input shaft of the final speed reduction gear unit are interconnected by an intermediate transmission shaft. A steering mechanism for turning front wheels of the automobile includes a steering tie rod coupled to the front wheels and disposed downwardly of the intermediate shaft between the transmission and the final speed reducer gear unit. The engine includes a cylinder having an axis inclined from the vertical in a transverse direction of the automobile, the final speed reduction gear unit being disposed on the side of the engine away from which the axis of the cylinder is inclined. The transmission includes an input shaft disposed coaxially with the crankshaft for receiving drive forces from the engine, a countershaft, an output shaft, a transmission mechanism operatively coupled to and disposed between the input shaft and the countershaft, and an output gear train operatively connecting the countershaft and the output shaft and disposed in a portion of the transmission closer to the final speed reduction gear unit.

3 Claims, 8 Drawing Sheets

DRIVE SYSTEM FOR AUTOMOBILE

This application is a continuation of application of application Ser. No. 07/720,906, filed Jun. 25, 1991, now abandoned, which is a divisional of application Ser. No. 07/282,476, filed Dec. 9, 1988, now U.S. Pat. No. 5,046,578.

The present invention relates to a drive system for propelling an automobile and, more particularly, to a drive system for use in a front-wheel or four-wheel drive automobile in which the drive system includes an engine having a crankshaft extending in the longitudinal direction of the automobile.

conventional front-wheel or four-wheel drive automobiles having engines with crankshafts extending in the longitudinal direction of the automobile generally include, as shown in FIGS. 13 and 14 of the accompanying drawings, a gear transmission comprising a torque converter (or clutch) 202 and a transmission mechanism 203 with a final speed reduction gear unit 204 disposed therebetween.

With the illustrated arrangement, an engine 201 overhangs forwardly of a pair of laterally spaced road wheels 205 disposed on the opposite sides of the final reduction gear unit 204. Therefore, the automobile is heavier at its front portion than at its rear portion, i.e., the weight of the automobile is not uniformly distributed in its longitudinal direction. Since the road wheels 205 are positioned rearwardly in the engine compartment of the automobile, the passenger compartment is small, particularly the foot space in front of the front seats.

Japanese Patent Publication No. 58-24289 discloses, as shown in FIG. 15 of the accompanying drawings, a final speed reduction gear unit 204 disposed directly underneath an engine 211. In order to make the passenger compartment as long as possible, the transmission 207 is located below the output shaft of the engine 211, and the output of the torque converter 206 and the input shaft of the transmission 207 are operatively coupled to each other by sprockets 208a, 208b and a chain 208c trained therearound. The disclosed layout allows the road wheels to be located in the front portion of the automobile, and reduces the forward overhang of the engine 211, thereby resulting in a larger passenger compartment space. Inasmuch as the final reduction gear unit 204 is positioned beneath the engine 211, however, the engine 211 has a relatively large height with respect to the automobile body, and so does the engine hood. This is disadvantageous in that the driver of the automobile has limited sight in the forward direction, and the automobile becomes less stable as the center of gravity of the engine 211 is higher. With the engine 211 located in a higher position, the output shaft thereof is also disposed in a higher position. The transmission coupled to the output shaft of the engine tends to project into the passenger compartment. In the drive system shown in FIG. 15, this problem is solved by positioning the transmission 207 in a lower position, and operatively connecting the output shaft of the engine 211 to the transmission 207 through the sprockets 208a, 208b and the chain 208c.

With the drive system arranged as shown in FIG. 15, since the transmission 207 is in a low position, a steering rod 209 for turning the front road wheels must be located forwardly of the final reduction gear unit 204. A steering mechanism which includes a steering gearbox and a steering shaft (not shown) would then suffer some limitations on its layout design in order to place the steering gearbox and the steering shaft out of physical interference with the axle shafts of the front road wheels.

According to another earlier proposal, a final speed reduction gear unit is disposed laterally of an engine in an automobile to lower the position of the engine mounted on the automobile body. The lowered engine permits the engine hood to be lowered, giving the driver good forward sight, and also allows the center of gravity thereof to be lowered, increasing stability of the automobile. The transmission operatively coupled between the engine and the final reduction gear unit for transmitting engine power to the final reduction gear unit disposed laterally of the engine must be compact in size to match the layout of the final reduction gear unit.

There also are known automobiles having a longitudinally disposed power plant which comprises an engine, a transmission, and a differential as a unit, and which transmits output power to drive wheels through an intermediate transmission shaft rotatably supported in the engine (see Japanese Patent Publication No. 48-13015). The intermediate transmission shaft is installed in place after bearings, oil seals, and other parts for the inter-mediate transmission shaft have been mounted in the engine. The process of installing the intermediate transmission shaft that is heavy is inefficient and the various parts for the intermediate transmission shaft cannot easily be replaced or otherwise serviced.

It is an object of the present invention to provide an automobile drive system which allows drive road wheels to be located in a relatively front portion of the automobile, and lowers the position of an engine with respect to the automobile body.

Another object of the present invention is to provide an automobile drive system which allows drive road wheels to be located in a relatively front portion of the automobile, lowers the position of an engine with respect to the automobile body, and permits a steering rod to be positioned rearwardly of a final speed reduction gear unit.

Still another object of the present invention is to provide an automobile drive system which allows drive road wheels to be located in a relatively front portion of the automobile, lowers the position of an engine with respect to the automobile body, and permits the input shaft of a transmission to be positioned coaxially with the output shaft of the engine.

Yet another object of the present invention is to provide an automobile transmission which is compact in size and can be positioned suitably in combination with an engine and a final speed reduction gear unit that is located laterally of the engine.

A still further object of the present invention is to provide an intermediate transmission shaft for transmitting output power from a power plant to drive road wheels, the intermediate transmission shaft being highly efficient to assemble and allowing associated parts to be replaced or otherwise serviced with ease.

According to an aspect of the present invention, there is provided a drive system in an automobile, comprising: an engine disposed in a front portion of the automobile and having a crank-shaft extending in a longitudinal direction of the automobile; a transmission coupled to a rear end of the engine and having an output shaft; a final speed reduction gear unit disposed laterally of the engine and separate from the transmission, the final speed reduction gear unit having an input shaft; an intermediate shaft interconnecting the output shaft of the transmission and the input shaft of the final speed reduction gear unit; and a steering mechanism for turning front wheels of the automobile, the steering mechanism including a steering tie rod coupled to the front wheels and disposed downwardly of the intermediate shaft between the transmission and the final speed reducer gear unit.

According to another aspect of the present invention there is also provided a drive system in an automobile, comprising: an engine disposed in a front portion of the automobile and having a crankshaft extending in a longitudinal direction of the automobile; a transmission coupled to a rear end of the engine and having an output shaft; a final speed reduction gear unit disposed laterally of the engine and separate from the transmission, the final speed reduction gear unit having an input shaft; and an intermediate shaft interconnecting the output shaft of the transmission and the input shaft of the final speed reduction gear unit, the engine including cylinders having axes inclined from the vertical in a transverse direction of the automobile, the final speed reduction gear unit being disposed on the side of the engine away from the direction in which the axes of the cylinders are inclined.

According to still another aspect of the present invention, there is further provided a drive system in an automobile, comprising: an engine disposed in a front portion of the automobile and having a crankshaft extending in a longitudinal direction of the automobile; a transmission coupled to a rear end of the engine and having an output shaft; and a final speed reduction gear unit disposed laterally of the engine; the transmission including an input shaft disposed coaxially with the crankshaft for receiving drive forces from the engine, a countershaft, an output shaft, a transmission mechanism operatively coupled to and disposed between the input shaft and the countershaft, and an output gear train operatively connecting the countershaft and the output shaft and disposed in a portion of the transmission closer to the final speed reduction gear unit.

According to yet another aspect of the present invention, there is also provided a transmission in an automobile having an engine including a crankshaft, comprising: an input shaft disposed coaxially with the crankshaft of the engine for receiving a drive force from the engine; a countershaft disposed substantially vertically downwardly of and parallel to the input shaft; a transmission mechanism operatively coupled to and disposed between the input shaft and the countershaft; and an output shaft disposed laterally of and vertically positioned at the same height as or upwardly of the countershaft.

According to yet still another aspect of the present invention, there is also provided a transmission in an automobile having an engine including a crankshaft and a final speed reduction gear unit for transmitting a drive force from the engine to drive road wheels, comprising: an input shaft disposed coaxially with the crankshaft of the engine for receiving a drive force from the engine; a countershaft disposed substantially vertically downwardly of and parallel to the input shaft; a transmission mechanism operatively coupled to and disposed between the input shaft and the countershaft; an output shaft; and an output gear train operatively connecting the countershaft and the output shaft and disposed in an end portion of the transmission closer to the final speed reduction gear unit which is disposed between the transmission and the drive road wheel.

According to a further aspect of the present invention, there is provided a transmission in an automobile having an engine including a crankshaft, a front final speed reduction gear unit for transmitting a drive force from the engine to front drive road wheels, and a rear final speed reduction gear unit for transmitting a drive force from the engine to rear drive road wheels, comprising: an input shaft disposed coaxially with the crankshaft of the engine for receiving drive forces from the engine; a countershaft disposed substantially vertically downwardly of and parallel to the input shaft, the countershaft projecting rearwardly for transmitting the drive force from the engine to the rear final speed reduction gear unit; a transmission mechanism operatively coupled to and disposed between the input shaft and the countershaft; and an output shaft projecting forwardly for transmitting the drive force from the engine to the front final speed reduction gear unit; and an output gear train operatively connecting the countershaft and the output shaft and disposed in an end portion of the transmission closer to the front final speed reduction gear unit.

According to a still further aspect of the present invention, there is also provided a power transmission system in an automobile having drive road wheels, comprising: an engine; and an intermediate transmission shaft for transmitting a drive force from the engine to the drive road wheels, the intermediate transmission shaft being rotatably supported at opposite ends thereof in and extending through the engine, one of the opposite ends of the intermediate transmission shaft extending through an rotatably supported in a bearing disposed in the engine and the other end of the intermediate transmission shaft being rotatably supported in a bearing holder which is detachably fixed to an outer surface of the engine.

According to a yet further aspect of the present invention, there is provided a drive system in an automobile, comprising: an engine disposed in a front portion of the automobile and having a crankshaft extending in a longitudinal direction of the automobile, the engine including a cylinder block inclined in a transverse direction of the automobile and having a crankcase, and an oil pan joined to a lower surface of the crankcase; a final speed reduction gear unit for driving a pair of laterally spaced drive road wheels, the final speed reduction gear unit being disposed on a side of the engine away from the side toward which the cylinder block is inclined, the final speed reduction gear unit including a differential case integrally formed with the oil pan, the final speed reduction gear unit having one output end coupled to one of the drive road wheels through an intermediate transmission shaft extending through the oil pan and rotatably supported in the oil pan and the cylinder block and an axle shaft, and the opposite output end coupled to the other drive road wheel through another axle shaft; and a transmission operatively connected between the engine and the final speed reduction gear unit.

The above and other objects, features and advantages of the present invention will become more apparent from the following description when taken in conjunction with the accompanying drawings in which preferred embodiments of the present invention are shown by way of illustrative example.

Like or corresponding parts are denoted by like or corresponding reference characters throughout views.

Figure 1:
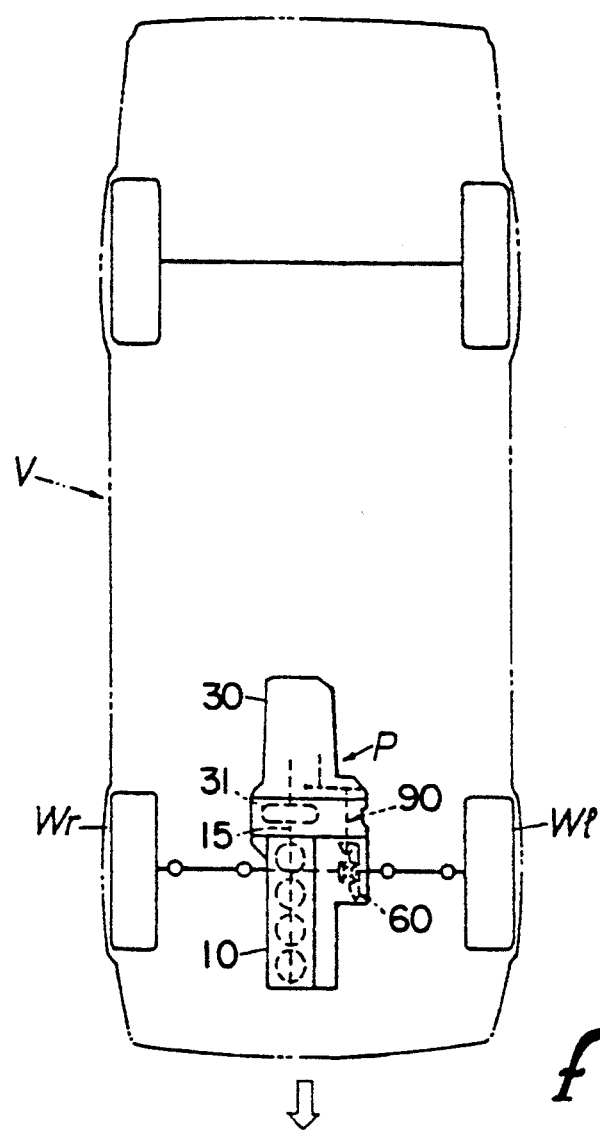
FIG. 1 is a schematic plan view of an automobile incorporating a drive system according to the present invention.
Figure 2:
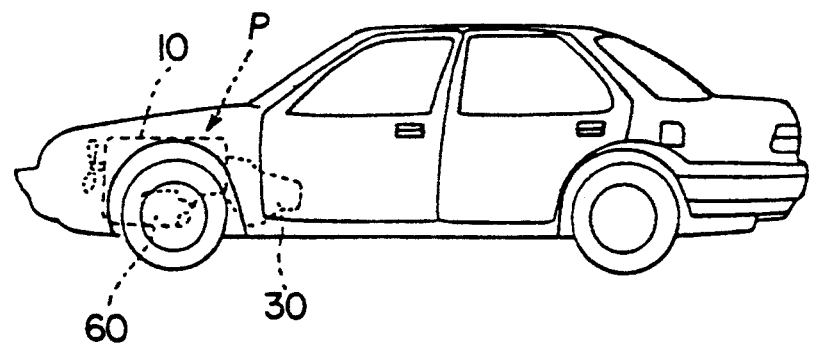
FIG. 2 is a side elevational view of the automobile shown in FIG. 1.

As shown in FIGS. 1 and 2, an automobile V includes a power plant or drive system P disposed in a front portion of the automobile V. The drive system P comprises an engine 10, a torque converter (clutch) 31, a transmission 30, and a final speed reduction gear unit 60. The drive system P is longitudinally installed on the automobile V (i.e., the engine 10 has a crankshaft 15 extending parallel to the longitudinal axis of the automobile V). Output power from the drive system P is transmitted through joints and drive axles to laterally spaced front wheels Wr, Wl as drive wheels.

Figure 3:
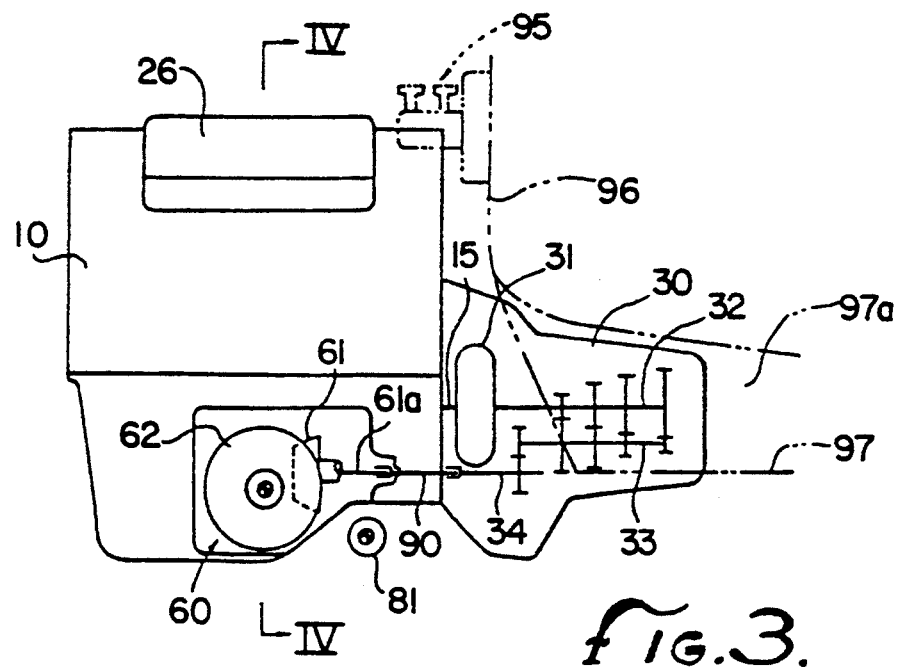
FIG. 3 is a schematic side elevational view of the drive system.

As illustrated in FIG. 3, the engine 10 has a crankshaft 15 extending longitudinally of the automobile V and the rear end of the crankshaft 15 is coupled to the transmission 30. The final reduction gear unit 60 is joined to the lefthand side of the engine 10. The output shaft or crankshaft 15 of the engine 10 is connected coaxially to an input shaft 32 of the transmission 30 through the torque converter 31. The transmission 30 includes a countershaft type transmission mechanism disposed between the input shaft 32 and a countershaft 33 extending parallel to the input shaft 32. The countershaft 33 is operatively coupled to an output shaft 34 through an output gear train.

The final reduction gear unit 60 has a speed reducer gear train comprised of a hypoid gear train with a final driver pinion 61 and a final ring gear 62, and a differential gear train. The final reduction gear unit 60 is on the lefthand side of the engine 10 and is separate from the transmission 30. The transmission output shaft 34 is held substantially coaxially with an input shaft (i.e., the shaft of the final driver pinion) 61a of the final reduction gear unit 60 and coupled thereto through an intermediate shaft 90.

Figure 15:
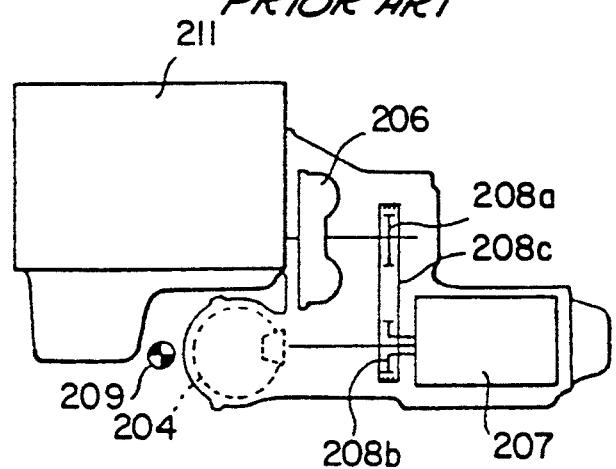
FIG. 15 is a side view showing another conventional drive system.

The engine compartment and the passenger compartment of the automobile are separated from each other by a dashboard panel 96 and a floor panel 97. The engine 10, the transmission 30, and the final reduction gear unit 60 are disposed in the engine compartment, with the transmission 30 partly projecting into an area within an outline of the lower portion of the passenger compartment. Since the final reduction gear unit 60 is mounted on the side of the engine 10, the engine 10 is considerably lower in position with respect to the body of the automobile than previous arrangements, such as shown in FIG. 15. Therefore, the transmission 30 is also positionally low, disposed into a tunnel 97a formed in the floor panel 97 in the longitudinal direction of the automobile body. The extent to which the transmission 30 projects into the passenger compartment is relatively small, thus making a large passenger compartment space available. Since the engine hood is also lowered by lowering the engine 10, forward sight as viewed from the driver's seat is excellent.

Since the transmission 30 and the final reduction gear unit 60 are disposed separately from each other and operatively coupled to each other through the intermediate shaft 90, a space is provided below the intermediate shaft 90. A tie rod 81 of the steering mechanism which is operatively coupled to the road wheels Wr, Wl can therefore be disposed in such a space, and hence the tie rod 81 can be disposed rearwardly of the final reduction gear unit 60 (and axle shafts extending laterally therefrom), without lowering the minimum height of the automobile from ground.

Figure 4:
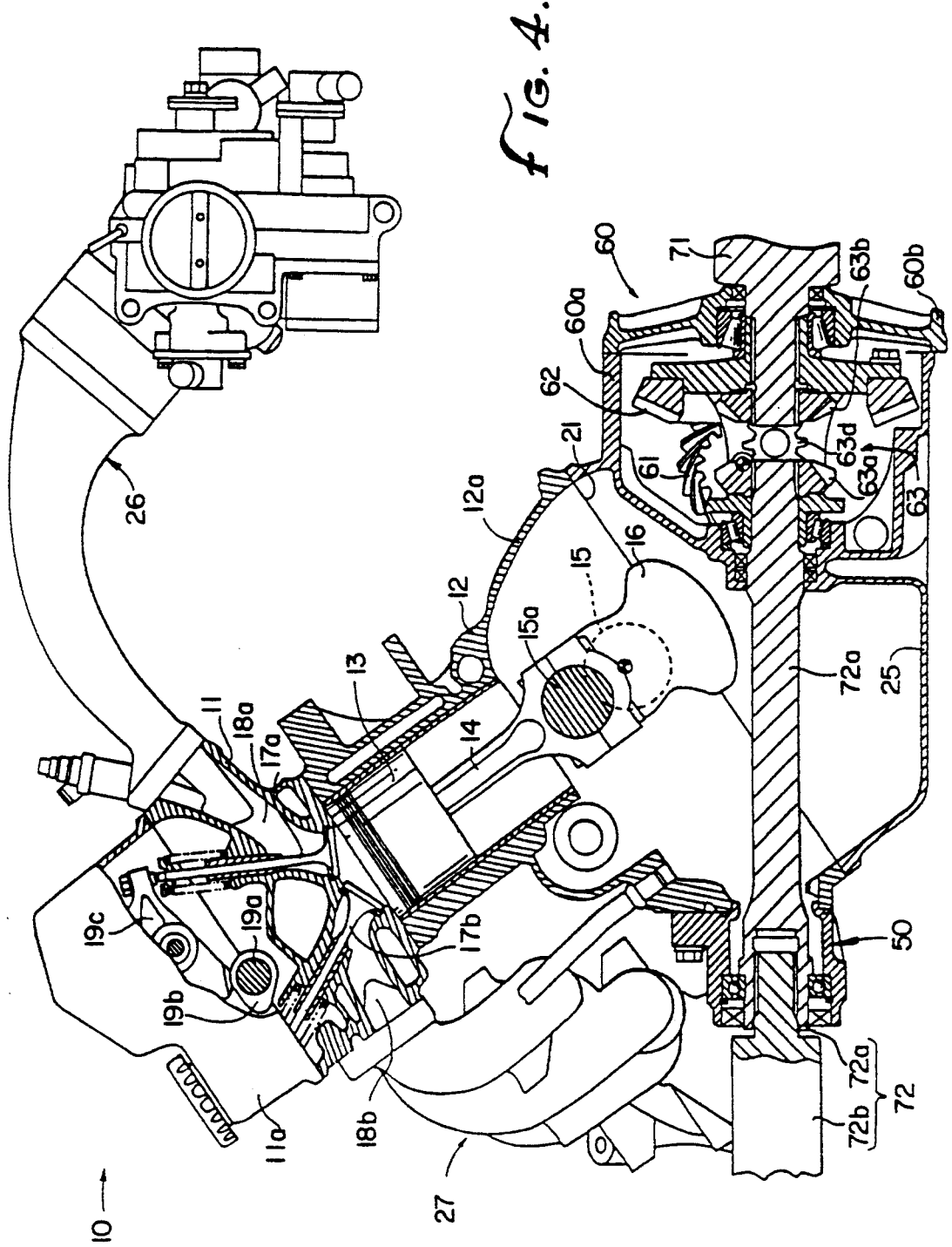
FIG. 4 is an enlarged cross-sectional view taken along line IV—IV of FIG. 3.

The drive system P will be described in greater detail with reference to FIGS. 4 and 5. The engine 10 is an in-line multicylinder engine having a plurality of cylinders, the axes of which are inclined to the left (to the righthand side of the automobile body) from the vertical as viewed from the front of the automobile as shown in FIG. 4. With the cylinder axes thus inclined, the height of the entire engine 10 is reduced and the engine hood is lowered. The engine 10 has an engine case comprising a cylinder block 12 in which pistons 13 are slidably accommodated for reciprocating sliding movement along the cylinder axes, a cylinder head 11 coupled to the upper surface of the cylinder block 12 and having intake and exhaust passages 18a, 18b and intake and exhaust valves 17a, 17b for opening and closing the intake and exhaust passages 18a, 18b, respectively, and an oil pan 25 coupled to the lower surface of the cylinder block 12.

The intake passages 18a are open at the side surface of the cylinder head 11 away from which the cylinder axes are, or the cylinder block 12 is, inclined. The open ends of the intake passages 18a are connected to an intake manifold 26. The exhaust passages 18b are open at the opposite side surface of the cylinder head 11 and toward which side the cylinder axes are inclined. An exhaust manifold 27 is connected to the open ends of the exhaust passages 18b and is mounted on the engine case. With this arrangement, the intake manifold 26 is disposed in a wide space on one side of the cylinder head 11 away from which the cylinder axes are inclined. It is therefore easy to increase the length of intake pipes for an increased intake air inertia effect to increase the performance of the engine.

A camshaft 19a having a plurality of cams 19b thereon arranged therealong is rotatably mounted in the upper end of the cylinder head 11 and the camshaft 19a extends along the cylinder bank, i.e., in the longitudinal direction of the automobile. Upon rotation of the camshaft 19a in synchronism with engine rotation, the cams 19b cause rocker arms 19c to open and close the intake valves 17a and other rocker arms (not shown) to open and close the exhaust valves 17b. The camshaft 19a and the rocker arms 19c are covered with a head cover 11a mounted on the upper surface of the cylinder head 11.

The cylinder block 12 includes a lower crankcase 12a in which a crankshaft 15 extending longitudinally is rotatably mounted. The crankshaft 15 includes a plurality of cranks 15a on which there are rotatably mounted connecting rods 14 having upper ends coupled to the respective pistons 13. The crankshaft 15 is rotated about its own axis through the connecting rods 14 and the cranks 15a in response to reciprocating movement of the pistons 13. Counterweights 16 are mounted on the crankshaft 15 and project away from the cranks 15a.

The oil pan 25 is joined to the lower surface 21 of the crankcase 12a of the cylinder block 12. As shown in FIG. 4, the lower surface 21 lies perpendicularly to the cylinder axes, and is inclined to the horizontal plane at an angle that is complimentary to the angle of inclination of the cylinder axes.

The final reduction gear unit 60 is installed on the side surface of the oil pan 25 which faces away from the direction in which the engine 10 is inclined. The oil pan 25 has an integral differential case 60a accommodating therein the internal mechanism of the final reduction gear unit 60. The final reduction gear unit 60 is thus integral with the engine 10. The structure of the final reduction gear unit 60 will be described later. With the final reduction gear unit 60 being disposed on a side away from the direction in which the engine 10 is inclined, the final reduction gear unit 60 does not physically interfere with the cylinder block 12. Thus, the engine 10 may be inclined through a large angle to lower the overall height thereof.

Figure 5:
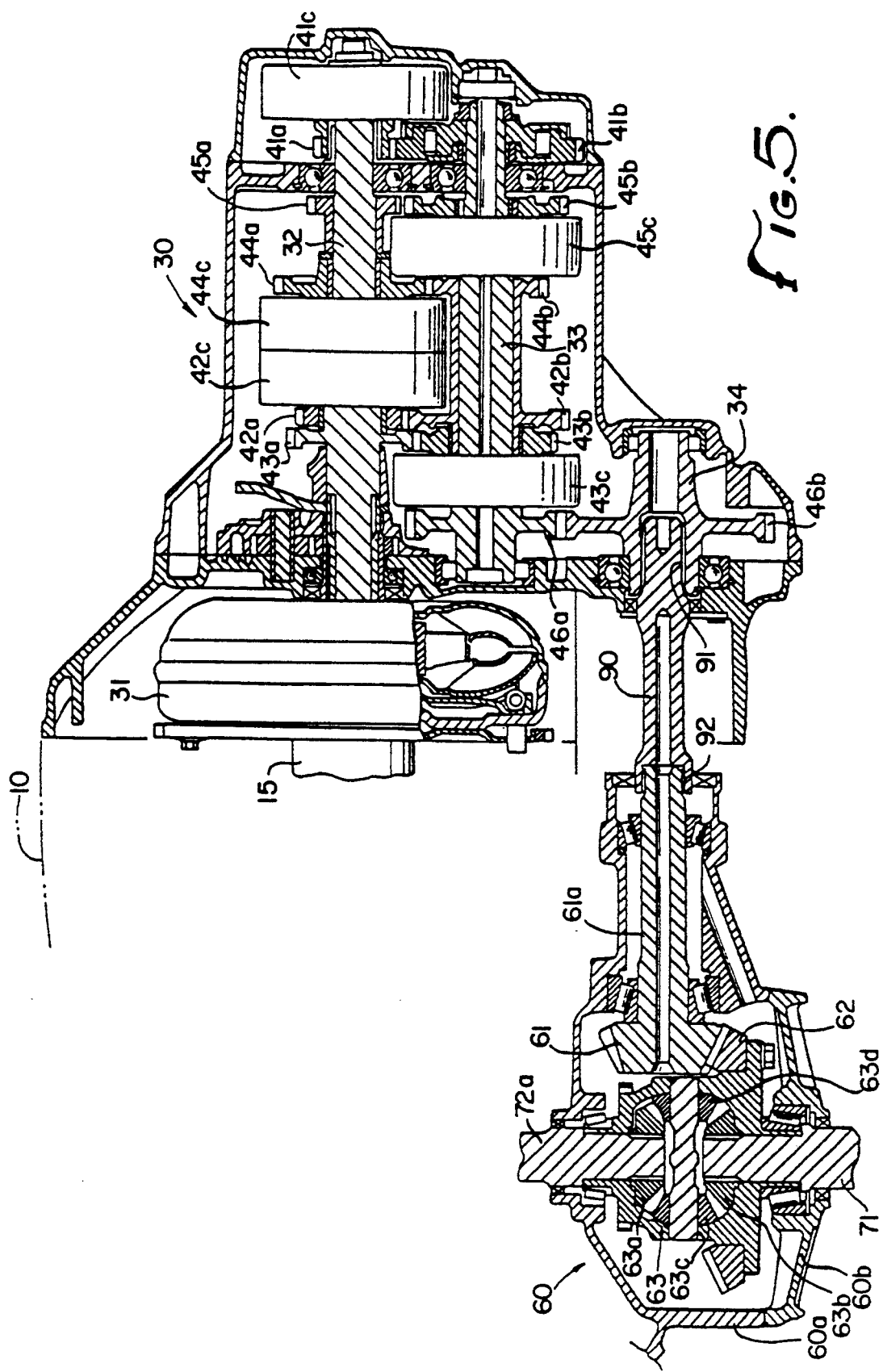
FIG. 5 is a cross-sectional view of the drive system taken along the shafts of a transmission thereof.

As shown in FIG. 5, the transmission 30 is connected to the rear end of the engine 10. The illustrated transmission 30 is an automatic transmission but it will readily appear to those skilled in the art that the transmission 30 can be a manual shift type transmission without departing from the present invention. The torque converter 31 is coupled to the output shaft or crankshaft 15 of the engine 10 and has an output shaft serving as the transmission input shaft 32. Thus, the transmission input shaft 32 is positioned coaxially with the crankshaft 15. The transmission countershaft 33 is disposed vertically downwardly of and parallel to the transmission input shaft 32. Between the transmission input shaft 32 and the transmission countershaft 33, there are disposed five gear trains, i.e., a first gear position gear train comprising intermeshing gears 41a, 41b, a second gear position gear train comprising intermeshing gears 42a, 42b, a third gear position gear train comprising intermeshing gears 43a, 43b, a fourth gear position gear train comprising intermeshing gears 44a, 44b, and a reverse gear position gear train comprising intermeshing gears 45a, 45b, (the reverse idler gear not being shown). These gear trains are associated with respective hydraulically operated clutches 41c, 42c, 43c, 44c, 45c for transmitting engine power through the gear trains. By selectively operating these clutches 41c, 42c, 43c, 44c, 45c, one of the five gear trains is selected to transmit engine power in the corresponding gear position.

Since the position of the engine 10 with respect to the automobile body is low, the transmission 30 is low and disposed in the floor tunnel 97a as shown in FIG. 3 even with the input shaft 32 disposed coaxially with the engine crankshaft 15 and with the transmission mechanism disposed between the input shaft 32 and the countershaft 32. Therefore, any conventional mechanism (such as the chain 208c in FIG. 15) for transmitting engine output power from the crankshaft to the transmission mechanism disposed below the crankshaft is not necessary, and the transmission is structurally simpler.

The transmission countershaft 33 and the transmission output shaft 34 parallel thereto are operatively coupled to each other through an output gear train comprising intermeshing gears 46a, 46b. The engine output power transmitted through one of the five transmission gear trains which is selected by the Corresponding hydraulically operated clutch is transmitted from the countershaft 33 to the output shaft 34. The output shaft 34 is positioned substantially coaxially with the input shaft of the final reduction gear unit 60, i.e., the shaft 61a of the final driver pinion 61, and coupled thereto through the intermediate shaft 90 which has splines 91, 92 on its opposite ends. The transmission 30 and the final reduction gear unit 60 are spaced from each other, leaving a space only large enough to accommodate the intermediate shaft 90 therein. Thus, it is possible to provide adequate space below the intermediate shaft 90 or the final driver pinion shaft 61a between the transmission 30 and the final reduction gear unit 60 for the tie rod 81 (FIG. 3). The output gears 46a, 46b are disposed in a front portion of the transmission 30 (i.e., closer to the final reduction gear unit 60). Thus, the output gear 46b may be compact and the intermediate shaft 90 may be short.

The hypoid gear train comprising the final driver pinion 61 and the final ring gear 62, and the differential gear train, denoted at 63, comprising four bevel gears 63a, 63b, 63c, 63d are disposed in a space defined in and between the case 60a and a cover 60b secured to the case 60a. The bevel gears 63c, 63d are rotatably supported by the final ring gear 62, and the bevel gears 63a, 63b are coupled respectively to axle shafts 71, 72. Therefore, the engine power transmitted to the transmission output shaft 34 is reduced in rotational speed by the hypoid gear train, and then split and transmitted to the axle shafts 71, 72 through the differential gear train 63 to drive transversely spaced front road wheels coupled respectively to the axle shafts 71, 72.

The axle shaft 71 extends away from the direction in which the engine 10 is inclined, and is coupled to the lefthand front road wheel. The axle shaft 72 extends in the direction in which the engine 20 is inclined. The axle shaft 72 comprises a first shaft or intermediate transmission shaft 72a extending through the engine case (i.e., a side wall of the oil pan 25 and a side wall of the crankcase 12a) and is rotatably supported in a bearing holder 50 attached to the side of the crankcase 12a remote from the final reduction gear unit 60, and a second shaft 72b coupled to the end of the first shaft 72a in the bearing holder 50 and extending outwardly and connected to the righthand front road wheel. The opposite ends of the first shaft 72a are rotatably supported in the engine case by means of respective bearings.

In the illustrated embodiment, the first axle shaft or intermediate transmission shaft 72a extends through the engine case and hence oil seals are required to prevent oil from leaking along the shaft 72a out of the engine case and into the final reduction gear unit case. To this end, the final reduction gear unit 60 is integrally joined to the engine oil pan 25. The axle shaft 72 extending from the final reduction gear unit 60 toward the righthand front road wheel may however be disposed out of he engine case. Though there would be no danger of oil leakage with this modification, the engine case (i.e., the oil pan 25) would have to have an upwardly extending recess accommodating the shaft 72a. The position of the engine would then be slightly higher than the illustrated embodiment in which the shaft 72a extends through the engine case.

Inasmuch as the crankshaft 15 is disposed substantially centrally in the transverse direction of the automobile, and the final reduction gear unit 60 is positioned in a lefthand side of the automobile, the lefthand axle shaft 71 (shown on the righthand side in FIG. 4) is relatively short. The final ring gear 62 is preferably disposed outwardly of the differential gear train 63 to maintain a certain length of the axle shaft 71. Where the final ring gear 62 is disposed outwardly of the differential gear train 6, the differential gear train 63 smaller in outside diameter than the final ring gear 62 projects into the oil pan 25. The degree to which the differential gear train 63 projects into the oil pan 25 is smaller than it would be if the final ring gear 62 were located inwardly of the differential gear train 63. Therefore, the final reduction gear unit 60 can be more easily disposed laterally of the oil pan 25.

The final reduction gear unit 60 is disposed remotely from the inclined cylinder axes of the engine 10 and therefore does not physically interfere with the cylinder block 12, whereby it can be disposed closely to the crankshaft 15 (i.e., more closely to the center of the automobile V). This prevents the axle shaft 71 from being excessively short, and allows the drive system P to be compact in size.

Figure 6:
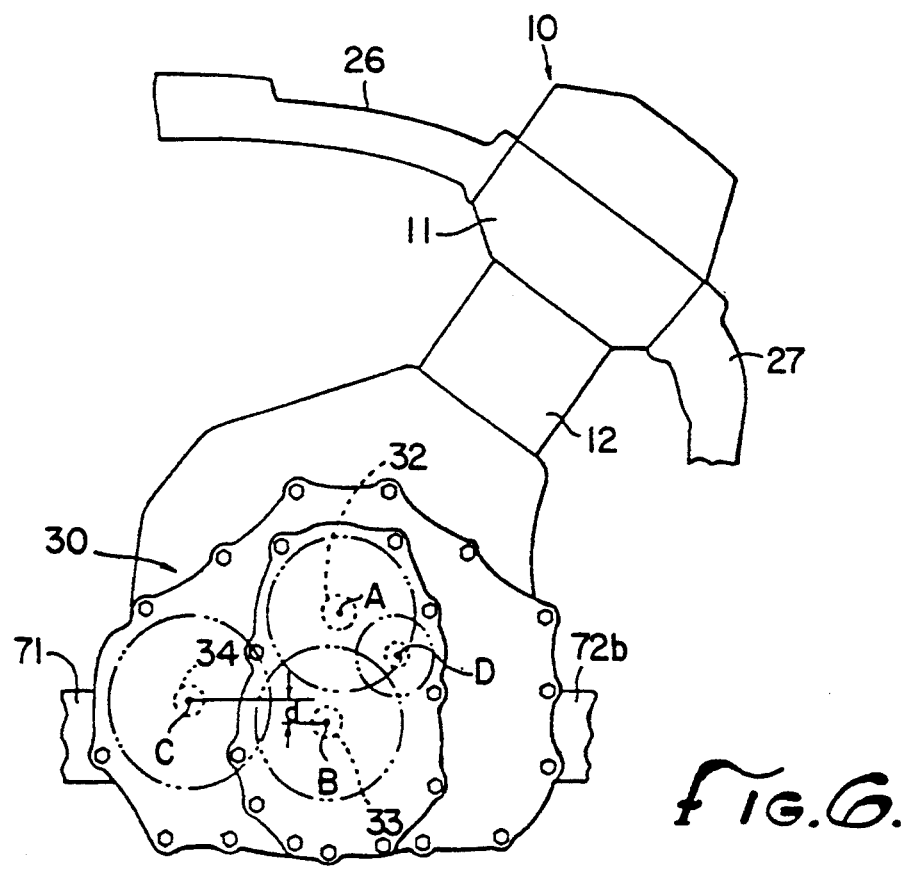
FIGS. 6 and 7 are schematic rear elevational views of the drive system.

The drive system of the above construction is viewed from behind in FIG. 6 to show the locations of the various shafts. The crankshaft 15 of the engine 10 and the input shaft 32 of the transmission 30 have their central axis positioned along an axial line normal to the sheet of FIG. 6, indicated at A. The transmission countershaft 33 has a central axis B positioned substantially vertically below the central axis A of the transmission input shaft 32. The transmission output shaft 34 has a central axis C positioned laterally of the countershaft 33 and displaced upwardly from the countershaft 33 by a distance d. With the shafts thus arranged, the transmission 30 is compact, the transmission input shaft 32 is positioned coaxially with the crankshaft 15 of the engine 10, and the final reduction gear unit 60 having its input shaft or final driver pinion shaft 61a coaxial with the transmission output shaft 34 is disposed on one side of the engine without undue limitations. The reverse idler gear has its central axis located at D laterally of both the input shaft 32 and the countershaft 33 on a side thereof opposite to the output shaft 34.

With the shafts thus arranged, the transmission 30 is of a reduced height and made compact. Even though the transmission input shaft 32 is disposed coaxially with the crankshaft 15 by lowering the position of the engine 10 with respect to the automobile body, since the output shaft 34 of the transmission 30 is displaced by the distance d upwardly from the transmission countershaft 33, the lower surface of the transmission 30 can lie flush with or be positioned upwardly of the lower surface of the engine 10. Therefore, a desired minimum height of the automobile from ground can easily be achieved. The distance d should therefore be of a zero or positive value, i.e., the transmission output shaft 34 should be vertically positioned at the same height as or upwardly of the transmission countershaft 33. Inasmuch as the transmission output shaft 34 is located alongside of the transmission countershaft 33 and the transmission input shaft 32, the final driver pinion 61a of the final reduction gear unit 60 is disposed laterally of the engine 10 and the pinion 61a and transmission output shaft 34 are positioned substantially coaxially with each other and coupled to each other through the intermediate shaft 90 without undue limitations.

Figure 7:
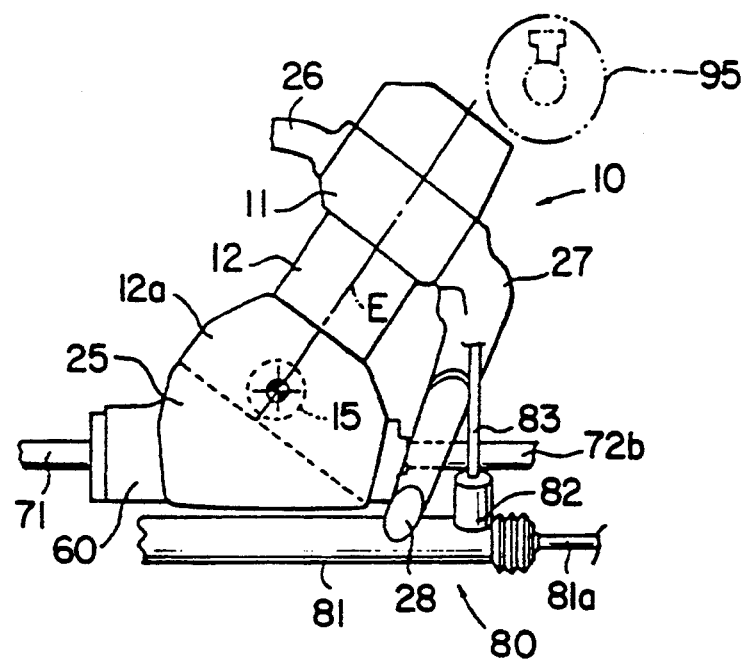
Figure 8:
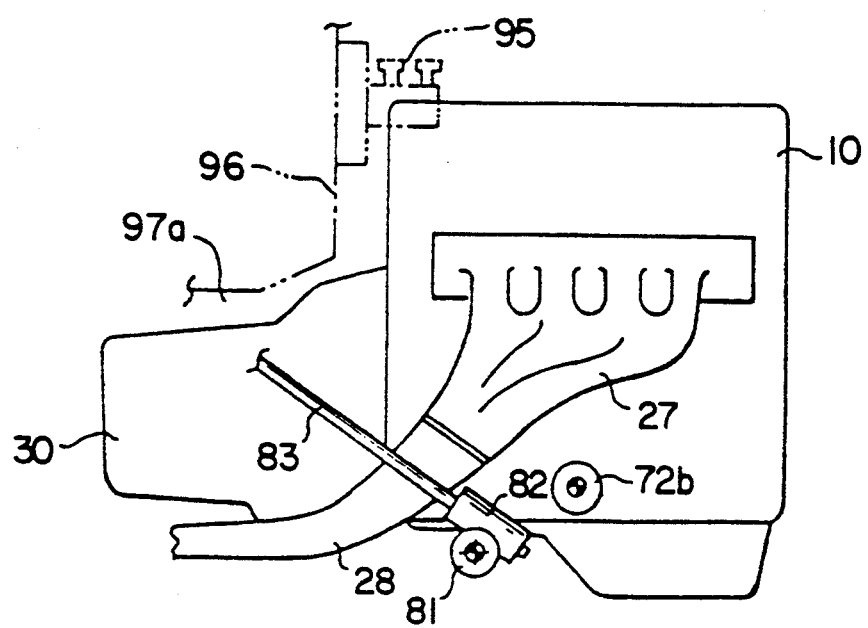
FIG. 8 is a side elevational view of the drive system.

FIG. 7 schematically shows the engine 10, the final reduction gear unit 60 joined thereto, and the steering mechanism, generally denoted at 80, which are viewed from behind the automobile. FIG. 8 shows the righthand side of the arrangement of FIG. 7. The steering wheel (not shown) of the automobile is located in a righthand side portion of the automobile, and hence a gearbox 82 of the steering mechanism 80 is disposed in the righthand side portion of the automobile, i.e., a side toward which the cylinder axes of the engine 10 are inclined. The tie rod 81 of the steering mechanism 80 is positioned rearwardly of the axle shafts 71, 72 extending through the engine case, so that a steering shaft 83 extending obliquely rearwardly and upwardly from the steering gearbox 82 is completely out of physical interference with the axle shafts 71, 72. Moreover, because the tie rod 81 is also positioned below and behind the exhaust manifold 27, the exhaust manifold 27 and exhaust pipe 28 connected to and extending obliquely rearwardly and downwardly from the exhaust manifold 27 can be bent inwardly toward the engine 10 without undue limitations and does not physically interfere with the steering shaft 83. As a consequence, the steering shaft 83 can be installed with greater layout freedom.

A brake master cylinder 95, shown by the two-dot-and-dash lines in FIGS. 7 and 8, is positioned upwardly of the engine 10 and is located easily out of physical interference with the engine 10 since the engine 10 is positioned very low. Because the exhaust manifold 27 extends obliquely downwardly from the side of the engine 10 which is inclined downwardly, the brake master cylinder 95 is spaced from the exhaust manifold 27, and hence is substantially free of any adverse thermal influence of the exhaust manifold 27.

Figure 9:
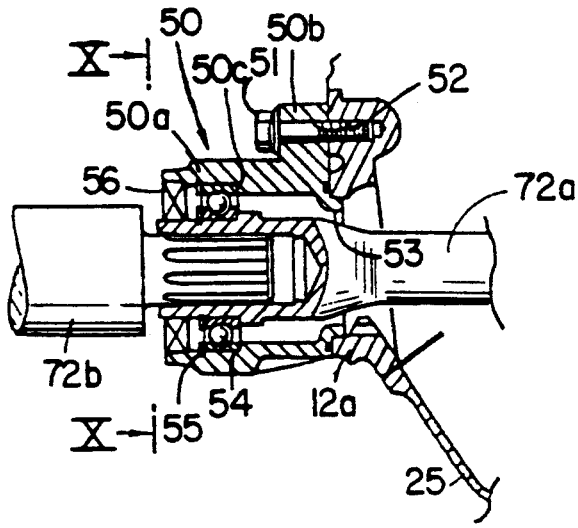
FIG. 9 is a cross-sectional view showing a bearing holder by which one end of an intermediate transmission shaft is rotatably supported.
Figure 10:
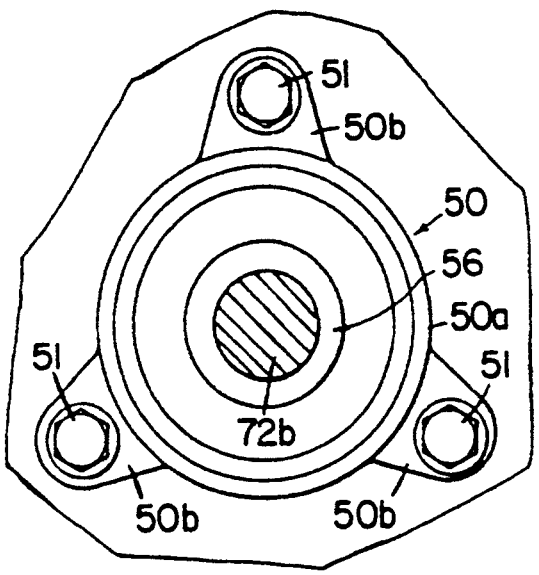
FIG. 10 is a cross-sectional view taken along line x—X of FIG. 9.

As shown in FIG. 9, the first axle shaft 72a has an outer end rotatably supported in the crankcase 12a by a bearing holder 50. The bearing holder 50 is separate from the engine 10 and includes a bearing sleeve 50a having a plurality of (three in the illustrated embodiment) radial attachment arms 50b (see FIG. 10). The bearing holder 50 is detachably fixed to an outer peripheral surface of the crankcase 12a by bolts 51 extending through respective bolt holes 52 defined in the respective attachment arms 50b and threaded into the wall of the crankcase 12a. The outer end of the intermediate transmission shaft 72a which projects outwardly through a hole 53 defined in the crankcase 12a is rotatably supported in the bearing sleeve 50a by a ball bearing 54. The ball bearing 54 is retained in the bearing holder 50 by a step 50c in the bearing sleeve' 50a and a circlip or retaining ring 55 fitted in the bearing holder 50. An oil-tight seal 56 is provided between the bearing sleeve 50a and the first axle shaft 72a and is fitted in the bearing sleeve 50a close to the ball bearing 54.

For installing the intermediate transmission shaft 72a, the bearing holder 50, the ball bearing 54, and the oil seal 56 are assembled in advance on the outer end of the intermediate transmission shaft 72a, and then the intermediate transmission shaft 72a is inserted, with the inner end thereof ahead, into the crankcase 12a through the hole 53, until the inner end of the intermediate transmission shaft 72a is splined into the bevel gear 63a of the differential gear assembly 63. Thereafter, the bearing holder 50 is fastened to the outer surface of the crankcase 12a by the bolts 51. Therefore, the intermediate transmission shaft 72a can be assembled in the engine 10 highly efficiently, and the intermediate transmission shaft 72a and its bearings and other associated parts can easily be replaced or otherwise serviced.

The outer end of the intermediate transmission shaft 72a is splined to the second axle shaft 72b which is coupled to the righthand road wheel Wr.

Figure 11:
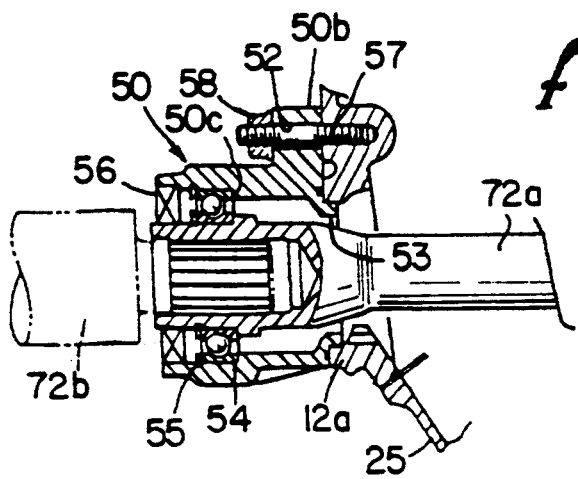
FIG. 11 is a cross-sectional view showing another bearing holder according to the present invention.

FIG. 11 shows another bearing holder by which the intermediate transmission shaft 72a is rotatably supported in the crankcase 12a. According to the embodiment shown in FIG. 11, the bearing holder 50 is fastened to the crankcase 12a by means of a plurality of stud bolts 57 extending through the respective attachment arms 50b of the bolt holes 52 in the bearing holder 50 and threaded into the crankcase 12a, and nuts 58 are threaded on the outer ends, respectively, of the stud bolts 57. With the embodiment of FIG. 11, when inserting the intermediate transmission shaft 72a into the crankcase 12a, the stud bolts 57 serve to guide the intermediate transmission shaft 72a for inserting its inner end properly into the differential gear assembly without damaging oil seals in the oil pan 25.

The bearing holder 50 in FIGS. 9 and 11 may be secured to the oil pan 25, and the oil pan 25 may be integral with bearing caps by which the crankshaft 15 is rotatably supported in the crankcase 12a.

Figure 12:
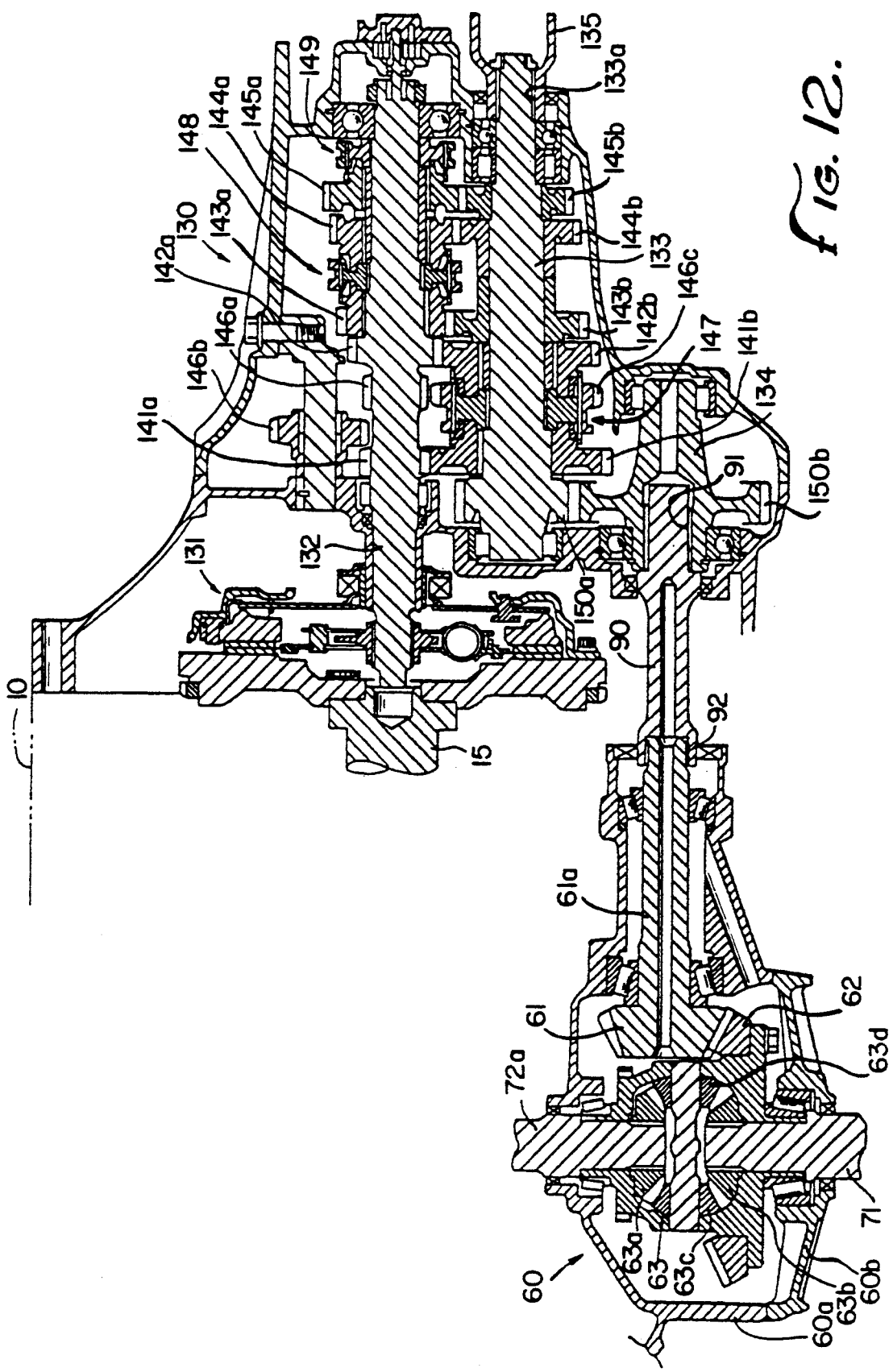
FIG. 12 is a cross-sectional view of a drive system according to another embodiment of the present invention.
Figure 13:
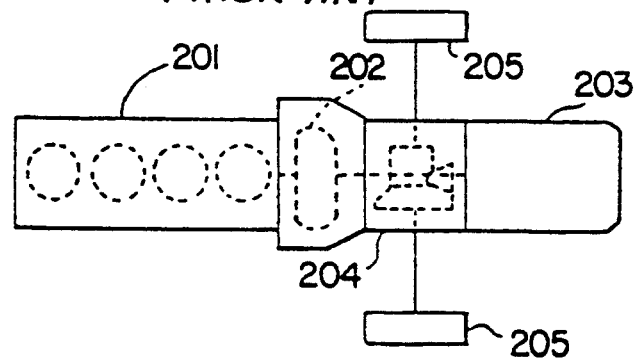
FIGS. 13 and 14 are top and side views showing a conventional drive system.
Figure 14:
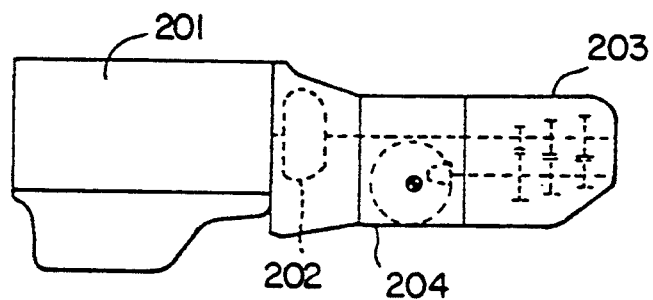

The drive system described so far is incorporated in a front-wheel drive automobile. However, the principles of the present invention are also applicable to a drive system for a four-wheel drive automobile. Such a drive system will be described with reference to FIG. 12. The four-wheel drive automobile includes a manual gear transmission 130 having a clutch 131 through which the rear end of the crankshaft 15 of the engine 10 is connected to an input shaft 132 of the transmission 130 which is coaxial with the crankshaft 15. The transmission 130 has six gear trains disposed between the input shaft 132 and a countershaft 133 parallel thereto, i.e., a first gear position gear train comprising intermeshing gears 141a, 141b, a second gear position gear train comprising intermeshing gears 142a, 142b, a third gear position gear train comprising intermeshing gears 143a, 143b, a fourth gear position gear train comprising intermeshing gears 144a, 144b, a fifth gear position gear train comprising intermeshing gears 145a, 145b, and a reverse gear position gear train comprising inter-meshing gears 146a, 146b, 146d. One of these first through five gear position gear trains is selected, at a time, through operation of synchromesh mechanisms 147, 148, 149, and engine power can be transmitted through the selected gear train. The reverse gear position gear train is selected by axially sliding the idler gear 146d.

The transmission countershaft 133 and a transmission output shaft 134 parallel thereto are coupled to each other through a pair of intermeshing output gears 150a, 150b. The engine power transmitted through a selected one of the gear trains of the transmission 130 is transmitted from the countershaft 133 to the output shaft 134 via the output gears 150a, 105b, and then transmitted from the output shaft 134 to the final speed reduction gear unit 60 through the intermediate shaft 90. The output gears 150a, 150b are disposed in a front portion of the transmission 130 (i.e., closer to the final reduction gear unit 60). Thus, the output gear 150b may be compact and the intermediate shaft 90 may be short.

The countershaft 133 of the transmission 130 has a rearwardly projecting rear end on which a yoke 135 for transmitting the engine power to rear road wheels is mounted. The yoke 134 is coupled through a universal joint to a propeller shaft (not shown) to transmit the engine power to the rear road wheels therethrough. Since the countershaft 133 is positioned below the input shaft 132, the propeller shaft may be disposed in the floor tunnel 97a (FIG. 3).

The present invention offers various advantages as follows. The engine 10 is disposed in the front portion of the automobile V with the crankshaft 15 extending in the longitudinal direction of the automobile V, the transmission 30, 130 is connected to the rear end of the engine 10, and the final speed reduction gear unit 60 is disposed laterally of the engine 10 separately from the transmission, the output shaft 34, 134 of the transmission 30, 130 being coupled to the input shaft 61a of the final speed reduction gear unit 60 by the intermediate shaft 90, as described above. Furthermore, the cylinder axes of the engine 10 are inclined from the vertical in a lateral direction of the automobile V, and the final speed reduction gear unit 60 is disposed away from the direction in which the engine 10 is inclined. The input shaft 32, 132 of the transmission 30, 130 is coaxial with the engine crankshaft 15. The transmission mechanism is disposed between the transmission input shaft 32, 132 and the transmission countershaft 33, 133. With this construction, the engine 10 is lowered with respect to the automobile body, and the transmission 30, 130 is reduced in size or made compact. The drive system P of the above construction is compact in size, and the passenger compartment is increased in space. The position of the engine with respect to the automobile body is lowered, and so is the engine hood to give the driver better forward sight. The lowered engine position lowers the center of gravity of the drive system P as a whole to increase the stability of the automobile. Since the tie rod 81 of the steering mechanism 80 is disposed below the inter-mediate shaft 90 between the transmission 30, 130 and the final speed reduction gear unit 60, the steering mechanism 80 is positioned rearwardly of the final speed reduction gear unit 60, and hence can be located without undue layout limitations.

In addition, the first shaft or intermediate transmission shaft 72a of the axle shaft 72 which extends from the final speed reduction gear unit 60 toward the righthand road wheel extends through the engine case, thus allowing the engine position to be further lowered for better forward sight and more automobile stability.

The output gears 46a, 46b or 150a, 150b of the transmission 30, 130 are disposed close to the final reduction gear unit 60 to further reduce the size of the transmission 30, 130 and also to reduce the length of the intermediate shaft 90 which interconnects the transmission 30, 130 and the final reduction gear unit 60.

Moreover, the transmission input shaft 32, 132 Is coaxial with the engine crankshaft 15, the transmission countershaft 33, 133 is disposed below the input shaft 33, 132, and the transmission output shaft 34, 134 is disposed laterally of and vertically positioned at the same height as or upwardly of the countershaft 33, 133. This arrangement makes the transmission 30, 130 compact. With the final reduction gear unit 60 being disposed laterally of the engine to lower the engine position, the transmission 30, 130 coupled to the engine 10 projects into the passenger compartment of the automobile V to only a small extent, and the transmission output shaft 34, 134 and the final reduction gear unit 60 are coupled with each other without undue layout limitations while maintaining a minimum height of the automobile from ground.

In the drive system for four wheel drive, the transmission output shaft 134 projects forwardly to transmit the engine power to the front wheel final reduction gear unit 60, whereas the transmission countershaft 133 projects rearwardly to transmit the engine power to a rear wheel final reduction gear unit (not shown). The transmission 130 for driving a four-wheel drive automobile is therefore made compact.

Although certain preferred embodiments have been shown and described, it should be understood that many changes and modifications may be made therein without departing from the scope of the appended claims.

What is claimed is:

1. A transmission in an automobile having an engine including a crankshaft, comprising:
    an input shaft disposed coaxially with said crankshaft of the engine for receiving a drive force from said engine;
    a countershaft disposed adjacent to and generally vertically downwardly of and parallel to said input shaft;
    a transmission mechanism operatively coupled to and disposed between said input shaft and said countershaft;
    an output shaft disposed laterally of said countershaft and said input shaft, wherein said output shaft is vertically positioned at least at the same height as said countershaft; and
    an idler shaft disposed laterally of said input shaft and said countershaft on a side of said input shaft and said countershaft opposite to said output shaft.

2. A transmission in an automobile having an engine including a crankshaft and a final speed reduction gear unit for transmitting a drive force from said engine to a drive road wheel, comprising
    an input shaft disposed coaxially with said crankshaft of the engine for receiving a drive force from said engine;
    a countershaft disposed adjacent to and generally vertically downwardly of and parallel to said input shaft;
    a transmission mechanism operatively coupled to and disposed between said input shaft and said countershaft;
    an output shaft;
    an idler shaft disposed laterally of said input shaft and said countershaft on a side of said input shaft and said countershaft opposite to said output shaft; and
    an output gear train operatively connecting said countershaft and said output shaft, said output gear train disposed in an end portion of said transmission closest to said final speed reduction gear unit, said final speed reduction gear unit being disposed between the transmission and said drive road wheel.

3. A transmission in an automobile having an engine including a crankshaft, a front final speed reduction gear unit for transmitting a drive force from said engine to a front drive road wheel, and a rear final speed reduction gear unit for transmitting a drive force from said engine to a rear drive road wheel, comprising:
    an input shaft disposed coaxially with said crankshaft of the engine for receiving drive forces from said engine;
    a countershaft disposed adjacent to and generally vertically downwardly of and parallel to said input shaft, said countershaft projecting rearwardly for transmitting the drive force from the engine to said rear final speed reduction gear unit;
    a transmission mechanism operatively coupled to and disposed between said input shaft and said countershaft; and
    an output shaft projecting forwardly for transmitting the drive force from the engine to said front final speed reduction gear unit;
    an idler shaft disposed laterally of said input shaft and said countershaft on a side of said input shaft and said countershaft opposite to said output shaft; and
    an output gear train operatively connecting said countershaft and said output shaft and disposed in an end portion of said transmission closest to said front final speed reduction gear unit.

* * * * *